(12) United States Patent
Lipke

(10) Patent No.: US 10,783,063 B2
(45) Date of Patent: Sep. 22, 2020

(54) SYSTEMS AND METHODS FOR TESTING A CUSTOMER ENVIRONMENT

(71) Applicant: salesforce.com, inc., San Francisco, CA (US)

(72) Inventor: Nathan Edward Lipke, Denver, CO (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 16/168,437

(22) Filed: Oct. 23, 2018

(65) Prior Publication Data

US 2020/0125483 A1 Apr. 23, 2020

(51) Int. Cl.
*G06F 9/44* (2018.01)
*G06F 11/36* (2006.01)
*G06F 8/41* (2018.01)
*G06F 8/34* (2018.01)

(52) U.S. Cl.
CPC .......... *G06F 11/3684* (2013.01); *G06F 8/34* (2013.01); *G06F 8/43* (2013.01); *G06F 11/3664* (2013.01); *G06F 11/3688* (2013.01); *G06F 11/3692* (2013.01)

(58) Field of Classification Search
CPC .......... G06F 11/3636; G06F 11/3664; G06F 11/323; G06F 11/362; G06F 11/366; G06F 11/3688; G06F 11/3466; G06F 11/3476; G06F 11/3656; G06F 8/34
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |

(Continued)

*Primary Examiner* — Duy Khuong T Nguyen
(74) *Attorney, Agent, or Firm* — LKGlobal | Lorenz & Kopf, LLP

(57) ABSTRACT

A graphical programming test generation system and method are provided. The system, for example, may include, but is not limited to a graphical programming test generator comprising a processor and a memory, the processor configured to generate a graphical programming test generator interface to generate an application, including, but not limited to, a canvas, a plurality of tools, each of the plurality of tools, when added to the canvas, generating a customizable node, wherein one of the plurality of tools is a test node, which when added to the canvas marks the application as a test application and defines a trigger event for executing the test application, wherein the processor is configured to generate the test application based upon one or more customizable nodes added to the canvas, monitor a customer environment for events, and execute the test application upon detection of the trigger event defined for the test application.

20 Claims, 12 Drawing Sheets

(56) References Cited

U.S. PATENT DOCUMENTS

| | | | |
|---|---|---|---|
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,681,383 B1* | 1/2004 | Pastor | G06F 8/30 717/126 |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans et al. | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,062,502 B1 | 6/2006 | Kesler | |
| 7,069,231 B1 | 6/2006 | Cinarkaya et al. | |
| 7,181,758 B1 | 2/2007 | Chan | |
| 7,289,976 B2 | 10/2007 | Kihneman et al. | |
| 7,340,411 B2 | 3/2008 | Cook | |
| 7,356,482 B2 | 4/2008 | Frankland et al. | |
| 7,401,094 B1 | 7/2008 | Kesler | |
| 7,412,455 B2 | 8/2008 | Dillon | |
| 7,508,789 B2 | 3/2009 | Chan | |
| 7,620,655 B2 | 11/2009 | Larsson et al. | |
| 7,698,160 B2 | 4/2010 | Beaven et al. | |
| 7,730,478 B2 | 6/2010 | Weissman | |
| 7,779,475 B2 | 8/2010 | Jakobson et al. | |
| 8,014,943 B2 | 9/2011 | Jakobson | |
| 8,015,495 B2 | 9/2011 | Achacoso et al. | |
| 8,032,297 B2 | 10/2011 | Jakobson | |
| 8,082,301 B2 | 12/2011 | Ahlgren et al. | |
| 8,095,413 B1 | 1/2012 | Beaven | |
| 8,095,594 B2 | 1/2012 | Beaven et al. | |
| 8,209,308 B2 | 6/2012 | Rueben et al. | |
| 8,275,836 B2 | 9/2012 | Beaven, et al. | |
| 8,457,545 B2 | 6/2013 | Chan | |
| 8,484,111 B2 | 7/2013 | Frankland et al. | |
| 8,490,025 B2 | 7/2013 | Jakobson et al. | |
| 8,504,945 B2 | 8/2013 | Jakobson et al. | |
| 8,510,045 B2 | 8/2013 | Rueben et al. | |
| 8,510,664 B2 | 8/2013 | Rueben et al. | |
| 8,566,301 B2 | 10/2013 | Rueben et al. | |
| 8,646,103 B2 | 2/2014 | Jakobson et al. | |
| 8,826,084 B1* | 9/2014 | Gauf | G06F 11/3688 714/32 |
| 2001/0044791 A1 | 11/2001 | Richter et al. | |
| 2002/0072951 A1 | 6/2002 | Lee et al. | |
| 2002/0082892 A1 | 6/2002 | Raffel | |
| 2002/0129352 A1 | 9/2002 | Brodersen et al. | |
| 2002/0140731 A1 | 10/2002 | Subramanian et al. | |
| 2002/0143997 A1 | 10/2002 | Huang et al. | |
| 2002/0162090 A1 | 10/2002 | Parnell et al. | |
| 2002/0165742 A1 | 11/2002 | Robbins | |
| 2003/0004971 A1 | 1/2003 | Gong | |
| 2003/0018705 A1 | 1/2003 | Chen et al. | |
| 2003/0018830 A1 | 1/2003 | Chen et al. | |
| 2003/0066031 A1 | 4/2003 | Laane et al. | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec et al. | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio et al. | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes-Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2006/0021019 A1 | 1/2006 | Hinton et al. | |
| 2008/0249972 A1 | 10/2008 | Dillon | |
| 2009/0063414 A1 | 3/2009 | White et al. | |
| 2009/0100342 A1 | 4/2009 | Jakobson | |
| 2009/0177744 A1 | 7/2009 | Marlow et al. | |
| 2010/0169867 A1* | 7/2010 | Wegmann | G06F 11/3664 717/129 |
| 2011/0247051 A1 | 10/2011 | Bulumulla et al. | |
| 2012/0042218 A1 | 2/2012 | Cinarkaya et al. | |
| 2012/0218958 A1 | 8/2012 | Rangaiah | |
| 2012/0233137 A1 | 9/2012 | Jakobson et al. | |
| 2012/0304096 A1* | 11/2012 | Shikhman | G06Q 10/06 715/771 |
| 2013/0212497 A1 | 8/2013 | Zelenko et al. | |
| 2013/0218948 A1 | 8/2013 | Jakobson | |
| 2013/0218949 A1 | 8/2013 | Jakobson | |
| 2013/0218966 A1 | 8/2013 | Jakobson | |
| 2013/0247216 A1 | 9/2013 | Cinarkaya et al. | |
| 2016/0140023 A1* | 5/2016 | Michelsen | G06F 3/04842 717/125 |
| 2018/0189033 A1* | 7/2018 | Narang | G06F 8/34 |
| 2019/0087075 A1* | 3/2019 | Dhayanithi | G06F 8/34 |
| 2020/0133825 A1* | 4/2020 | Eidson | G06F 11/3612 |

* cited by examiner

Flow Input

Label

Flow Input Name

Flow Test

Input Name

Number Value

Test Value

Save    Save & New    Cancel

Flow Output

- Label
- Flow Output Assertion Name
- Flow Test
- Output Name
- Expected Number Value
- Expected Test Value
- Message

[ Save ]  [ Save & New ]  [ Cancel ]

SYSTEMS AND METHODS FOR TESTING A CUSTOMER ENVIRONMENT

TECHNICAL FIELD

The following relates to application generation and test, and more particularly relates to systems and processes for generating a testing application from a graphical programming language.

BACKGROUND

Cloud computing-based customer environments are increasingly being used by companies and other organizations. These environments allow the owners to create and host customized environments hosting numerous virtual applications and offering a multitude of services.

DESCRIPTION OF THE DRAWING FIGURES

Exemplary embodiments will hereinafter be described in conjunction with the following drawing figures, wherein like numerals denote like elements, and FIG. 1 is a block diagram of an exemplary graphical programming system, in accordance with the embodiment;

FIG. 9 illustrates a wizard corresponding to the flow input tool, in accordance with an embodiment;

FIG. 10 illustrates a wizard corresponding to the flow output tool, in accordance with an embodiment;

DETAILED DESCRIPTION

According to various exemplary embodiments, systems and methods are provided to test customer environments for consistency and adherence to rules using a graphically programming language. Accordingly, as discussed in further detail below, a user can create and execute a test application testing any number of applications in a customer environment without having to write any code.

Figure 1:
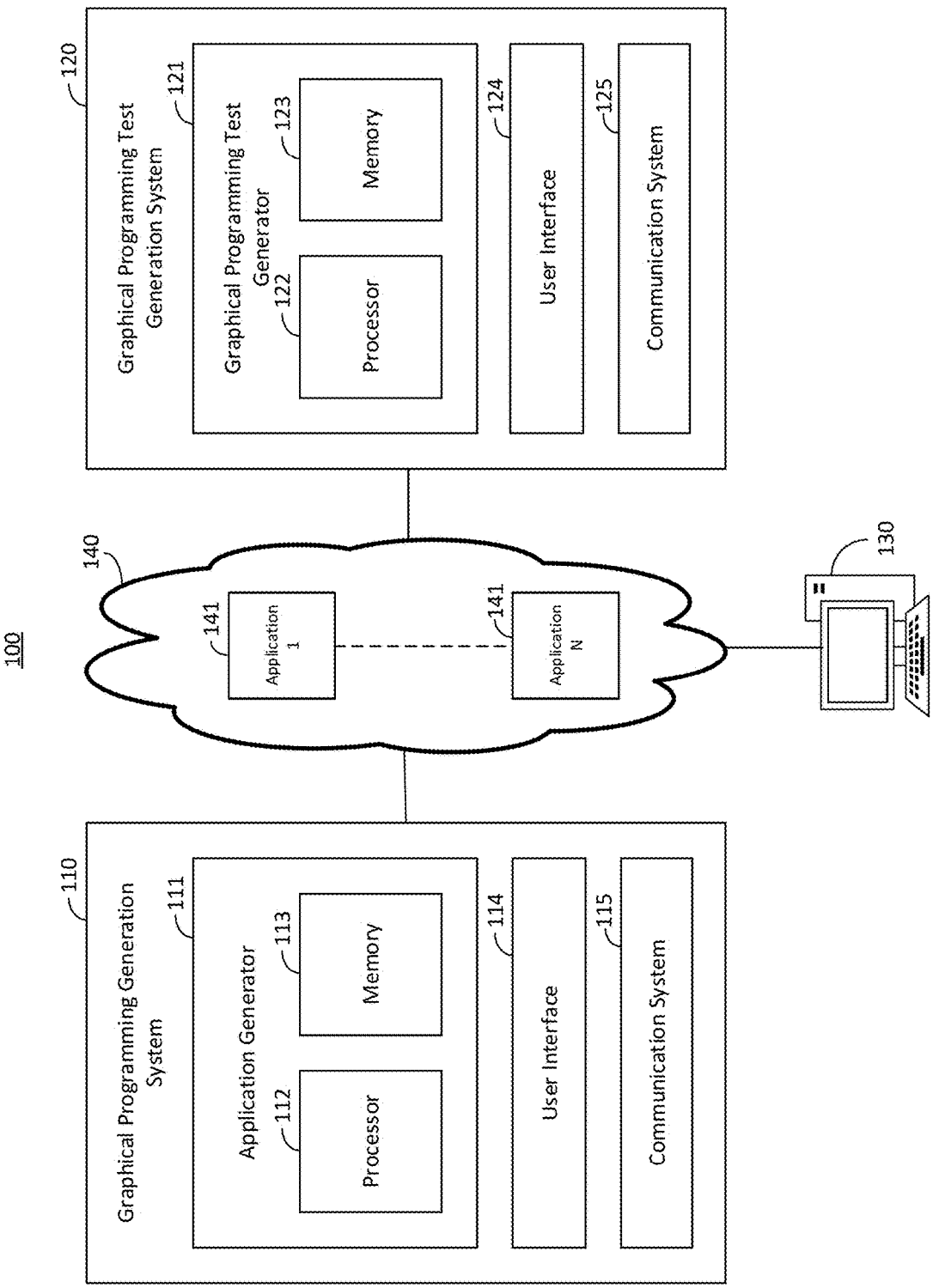

FIG. 1 is a block diagram of an exemplary graphical programming system 100, in accordance with the embodiment. The graphical programming system 100 includes a graphical programming generation system 110 and a graphical programming test generation system 120. The graphical programming generation system 110 may be used to generate an application without having to write any code. Likewise, the graphical programming test generation system 120 may be used to generate a test application without having to write any code. The applications generated by the graphical programming generation system 110 and graphical programming test generation system 120 may be an executable application or a virtual application. In this context, the executable application may be installed or otherwise run on a computing device 130, such as a computer, a cellular phone, or the like. In contrast, the virtual application may be executable through a web browser or the like, and, thus may be executed without having to be installed on a computing device 130.

The graphical programming generation system 110 includes an application generator 111. The application generator 111 provides a graphical user interface (GUI) for generating the application. As discussed in further detail below, the application generator 111 and graphical user interface provide an environment for generating an application without having to write any code. The application generator 111 may be used for simple or complex applications depending upon which tools are available and used by a user.

The application generator 111 includes a processor 112 and a memory 113. The processor 112 may be a central processing unit (CPU), a graphics processing unit (GPU), an application specific integrated circuit (ASIC), a field programmable gate array (FPGA), a microcontroller, or any other logic unit or any combination thereof. The memory 113 may be any combination of volatile and non-volatile memory. In one embodiment, for example, a portion of the memory 113 may be a cloud-based memory remote from the graphical programming generation system 110 and accessible via a data connection. The memory 113 may include non-transitory instructions for executing the application generator 111 as discussed in further detail below.

In one embodiment, for example, the graphical programming generation system 110 may be a server. In this embodiment, the application generator 111 may itself be a virtual application accessible on the graphical programming generation system 110 via the computing device 130. In another embodiment, the graphical programming generation system 110 may be a computing device such as a desktop computer, a laptop, a cellular phone, a tablet, or the like.

In one embodiment, for example, the graphical programming generation system 110 may include a user interface 114. The user interface 114 may include one or more of a display, a touch screen interface, a mouse, a trackpad, a trackball, a keyboard, voice recognition, or the like, or any combination thereof. The graphical programming generation system 110 may further include a communication system 115. The communication system 115 may utilize any wired or wireless communication systems to exchange data with other components of the graphical programming system 100.

Figure 2:
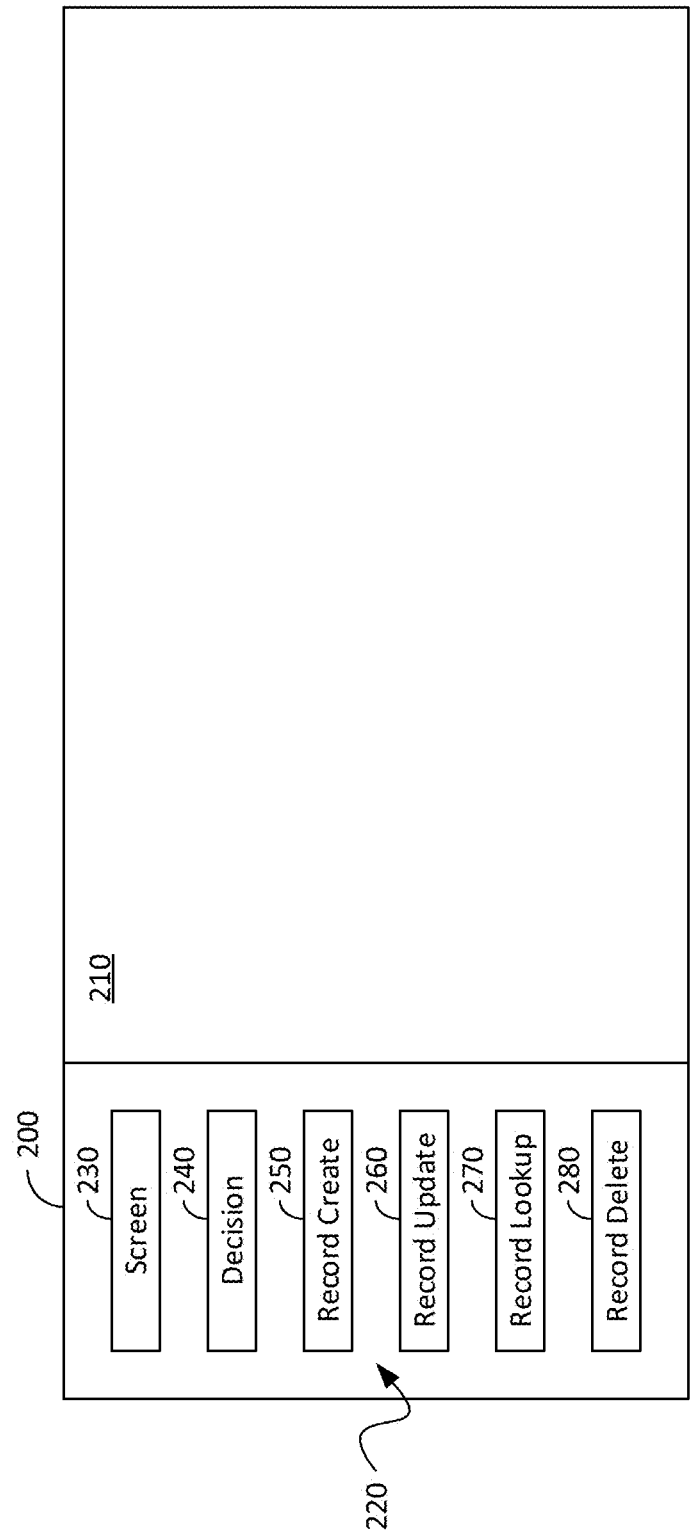
FIG. 2 is an exemplary display of the application generator of the graphical programming generation system, in accordance with an embodiment.

FIG. 2 is an exemplary display of the application generator 111 of the graphical programming generation system 110, in accordance with an embodiment. The application generator 111 includes a palette 200 and a canvas 210. The palette 200 includes numerous tools 220 representing different nodes which can be added to the canvas 210 by, for example, a drag and drop action by a user. In the embodiment illustrated in FIG. 2, the tools 220 include a screen 230, a decision 240, a record create 250, a record update 260, a record lookup 270 and a record delete 280. However, the number of tools and the functions thereof may vary widely.

The tools 220 may include standard tools which are available to all users of the application generator 111, such as those discussed above, and custom tools which may be generated for a specific customer of the application generator 111. For example, a customized process used by the customer may be added as a tool such as a custom quote generation for a business, custom secured login screens using protocol defined by the customer, or the like. Each tool 220, when added to the canvas 210 becomes a node of a type associated with the tool. For example, when a user adds a screen tool 230 to the canvas 210, a screen node is added to the virtual application. Accordingly, a user can build a virtual application by adding nodes to the canvas 210 and customizing those nodes thereby building the virtual application without having to do any coding.

Figure 3:
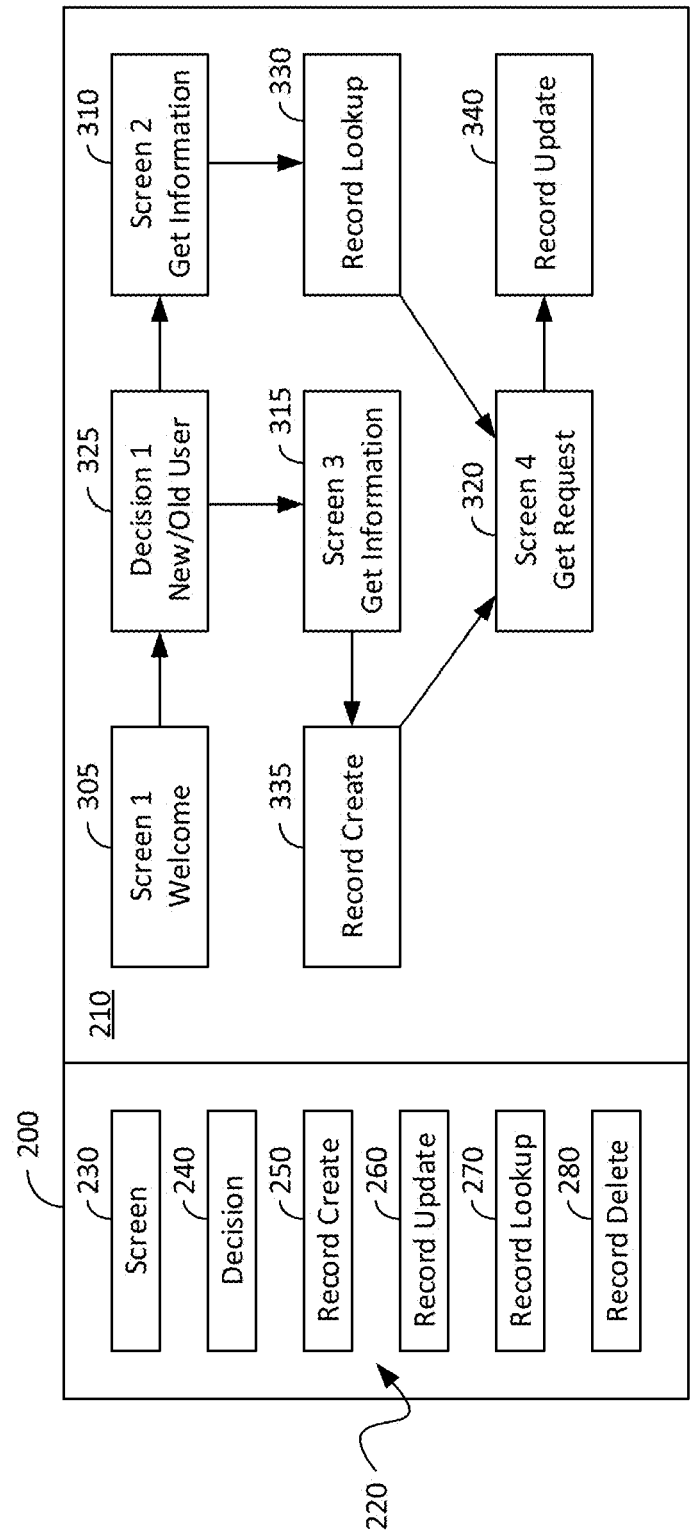
FIG. 3 illustrates an exemplary virtual application generated using the application generator, in accordance with an embodiment.

FIG. 3 illustrates an exemplary application 300 generated using the application generator 111. In this example, the application 300 gets a request from a user of the virtual application 300 and associates the request with the user. The virtual application 300 illustrated in FIG. 3 includes eight nodes, including four screens nodes 305, 310, 315 and 320, a decision node 325, record lookup node 330, a record create node 335, and a record update node 340.

Figure 4:
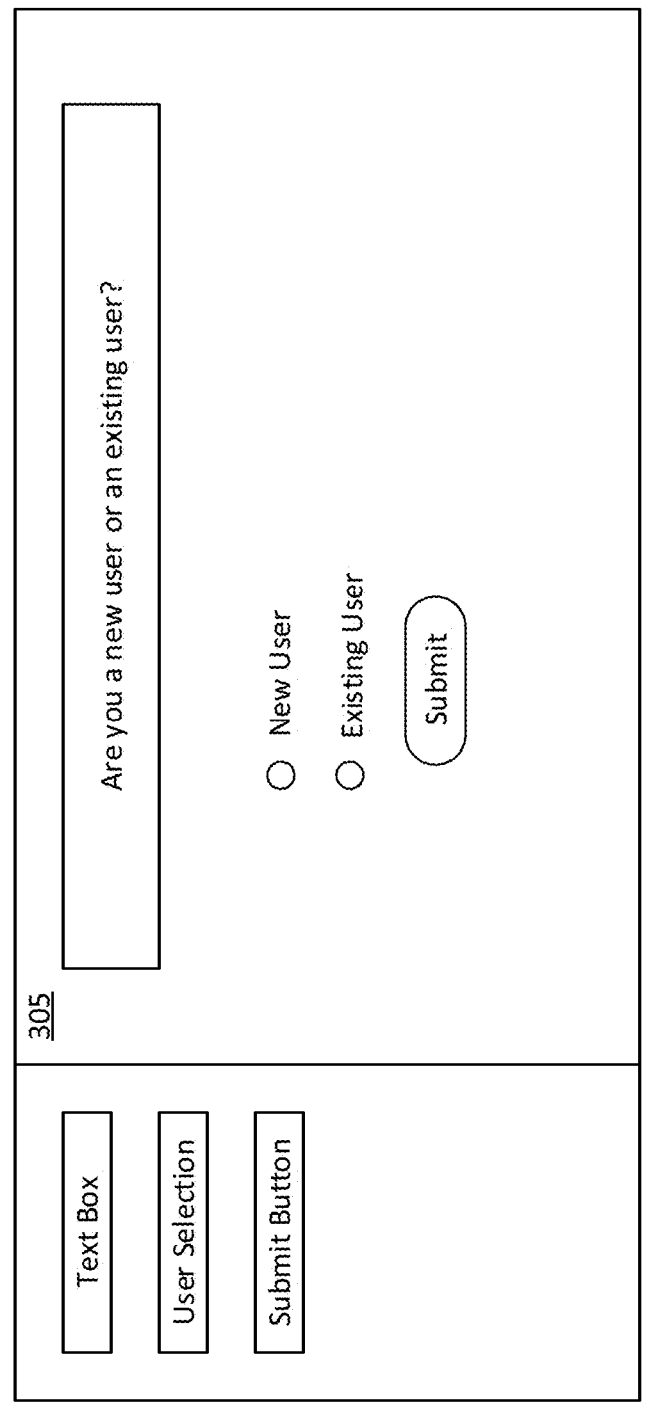
FIG. 4 illustrates an exemplary screen, in accordance with an embodiment.

As discussed above, the screen tool 230 allows a user to add one or more screen nodes to their application. Each screen node is a customizable display which allows the application to display information to the user or collect information from the user. In one embodiment, for example, a wizard may be displayed to the user after a node is added to the canvas 210, which walks to user through the process of creating the specific node. In another embodiment, tools, like the tools 220 illustrated in FIG. 2, may be used to create the node. FIG. 4 illustrates an exemplary screen in accordance with an embodiment. In particular, FIG. 4 illustrates screen node 305 illustrated in FIG. 3. As seen in FIG. 4, the screen requests the user to submit whether they are a new user or an existing user. The screen node 305 is built using the tools 220 in the palette 200 which a specific to the screen tool 230. The tools 220 illustrated in FIG. 4 include a text box, a user section tool and a submit button. The text box allows the user creating the virtual application to add text to the screen node 305. The user selection tool allows the user creating the application to present to a user operating the virtual application choices, such as drop down menus, radio buttons, check boxes or the like. The submit button allows the user to submit their selection to the virtual program. The tools illustrated in FIG. 4 are merely exemplary and could include any number of tools allowing the screen to include any feasible function. Accordingly, the user can customize each node by dragging and dropping tools associated with the node onto the canvas for the node, by using a wizard, or any combination thereof.

Returning to FIG. 3, the other tools 220 allow the virtual application to process information collected from a screen node. For example, the decision tool 240 may be used to switch between multiple paths of the virtual application based upon user input. For example, as seen in FIG. 3, the decision node 325 determines if the user selected the new user option or the existing user option and sends the application along a path associated with the selection option. The record create tool 250, the record update tool 260, a record lookup tool 270 and a record delete tool 280 may create, modify, lookup or delete a record in a database associated with the virtual application. The record may be, for example, a user profile, a business contact, an opportunity, or the like. The application generator 111, once the user has completed the application, then converts the created nodes into code for the virtual application, thereby creating an application without the user having to code the application itself.

Returning to FIG. 1, once the virtual application is completed, it can be added to an organization 140. An organization 140 is a customer environment unique to each customer. In this context, the customer is generally a business, however, the customer could also be individuals or other type of organizations. In one embodiment, for example, the organization 140 may be a cloud-based system accessible over any wired or wireless network connection. The organization 140 may have a multitude of virtual applications 141(1)-141(N) performing any variety of tasks and may have been written by many different authors. A desirable feature of any organization 140 is consistency between applications and adherence to rules. Manually testing dozens, hundreds or even thousands of applications for consistency and adherence to rules is tedious. Accordingly, the graphical programming system 100 further includes a graphical programming test generation system 120.

The graphical programming test generation system 120 provides a graphical interface which can be used for creating a test and an environment for applying the test to all the virtual applications in the organization 140. The graphical programming test generation system 120 includes a graphical programming test generator 121 which may be used to create the test. The graphical programming test generator 121 include a processor 122 and a memory 123. The processor 122 may be a central processing unit (CPU), a graphics processing unit (GPU), an application specific integrated circuit (ASIC), a field programmable gate array (FPGA), a microcontroller, or any other logic unit or any combination thereof. The memory 123 may be any combination of volatile and non-volatile memory. In one embodiment, for example, a portion of the memory 123 may be a cloud-based memory remote from the graphical programming test generation system 120 and accessible via a data connection. The memory 123 may include non-transitory instructions for executing the graphical programming test generator 121 as discussed in further detail below.

While the graphical programming test generation system 120 and the graphical programming generation system 110 are illustrated as separate elements, the respective systems may be a single computing device, such as a server, a personal computer, or the like. Additionally, even if the graphical programming test generation system 120 and the graphical programming generation system 110 are separate systems, they may share resources such as a cloud-based memory.

In one embodiment, for example, the graphical programming test generation system 120 may be a server. In this embodiment, the graphical programming test generator 121 may itself be a virtual application accessible on the graphical programming test generation system 120 via the computing device 130. In another embodiment, the graphical programming test generation system 120 may be a computing device such as a desktop computer, a laptop, a cellular phone, a tablet, or the like.

In one embodiment, for example, the graphical programming test generation system 120 may include a user interface 124. The user interface 124 may include one or more of a display, a touch screen interface, a mouse, a trackpad, a trackball, a keyboard, voice recognition, or the like, or any combination thereof. The graphical programming test generation system 120 may further include a communication system 125. The communication system 125 may utilize any wired or wireless communication systems and may be used to exchange data with any other components of the graphical programming system 100.

The test generated using the graphical programming test generation system 120 is an application or a virtual application, like those created using the graphical programming generation system 110. However, unlike the applications in the organization 140, also known as customer applications, the test applications are marked as tests using a test tool, as discussed in further detail below.

Figure 5:
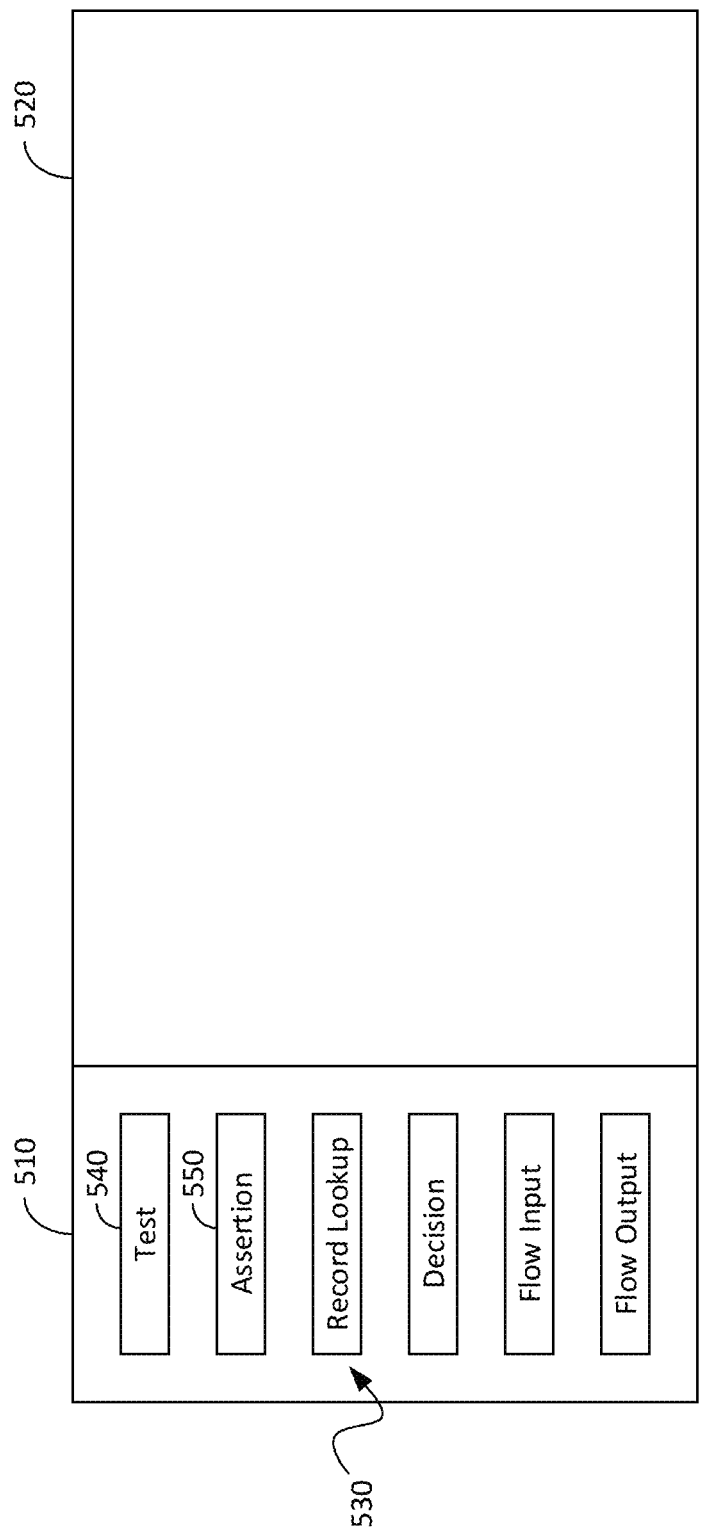
FIG. 5 illustrates an exemplary interface of the graphical programming test generator, in accordance with an embodiment.

FIG. 5 illustrates an exemplary interface 500 of the graphical programming test generator 121, in accordance with an embodiment. The graphical programming test generator 121 includes a palette 510 and a canvas 520. The palette 510 includes numerous tools 530 representing different nodes which can be added to the canvas 520 by, for example, a drag and drop action by a user. The tools 530 may include, for example a test tool 540 which marks the application as a test, an assertion tool 550 which may test an assertion, a record lookup tool for retrieving a record upon which the test is performed, a formula tool for calculating mathematical and functional values (date, time, text, Boolean, or the like), a decision tool for deciding which path to follow, a loop tool for iterating over collection of values or objects, record insert, update and delete tools for modifying the test data, a flow input tool for assigning input variables to the test, a flow output tool for assigning outputs of the test, or the like. However, the number of tools 530 and the functions thereof may vary widely. The tools 530 may include standard tools which are available to all users of the graphical programming test generator 121, such as those discussed above, and custom tools which may be generated for a specific customer of the graphical programming test generator 121.

Each tool 530, when added to the canvas 520 adds a node to a test. The test tool 540, when added to the canvas 520, generates a test node which marks the application as a test and adds the test to the organization 140. The graphical programming test generator 121 may generate a wizard and/or other tools to customize the specific test node. For example, the customizable options may include, for example, a frequency that the test is performed. For example, a test may be set up to automatically be performed each time a new application is added to the organization 140 to ensure that the new application meets the requirements set forth in the test. Alternatively, a test could be set up to be performed only upon request by an administrator of the organization. The test may also be run each time a certain application is run. In this embodiment, the test (once completed and added to organization) may be selectable as a tool in the application generator 111 and added to a customer application via a drag and drop operation when the application is created using the graphical programming generation system 110. For example, a user when creating an application may cause an account to be created in the organization. The user can then add a "test account creation" test to the application to ensure the account was created according to the assertion in the "test account creation" test. For example, the test may be set up such that in order for an account to be created a zip code must be collected which is a global requirement throughout the organization 140. Accordingly, by creating a test and adding the test to an organization 140, the creation of an application is simplified as a user can merely add corresponding test(s) to the application rather than having to create decision nodes testing all of the organizations global rules.

Each test application in the organization 140 may test an assertion, an application setting, a database state, or any combination thereof. Each assertion is a rule which is applied to the organization 140. The assertion may test that a variable is true (e.g., that an account is active, a valid zip code was received, etc.), that a variable is false (e.g., a subscription is not expired), that a variable is equal to something (e.g., that a service level agreement is Gold level), that a variable does not equal something (e.g., that a billing state does not equal New York), or the like.

Figure 6:
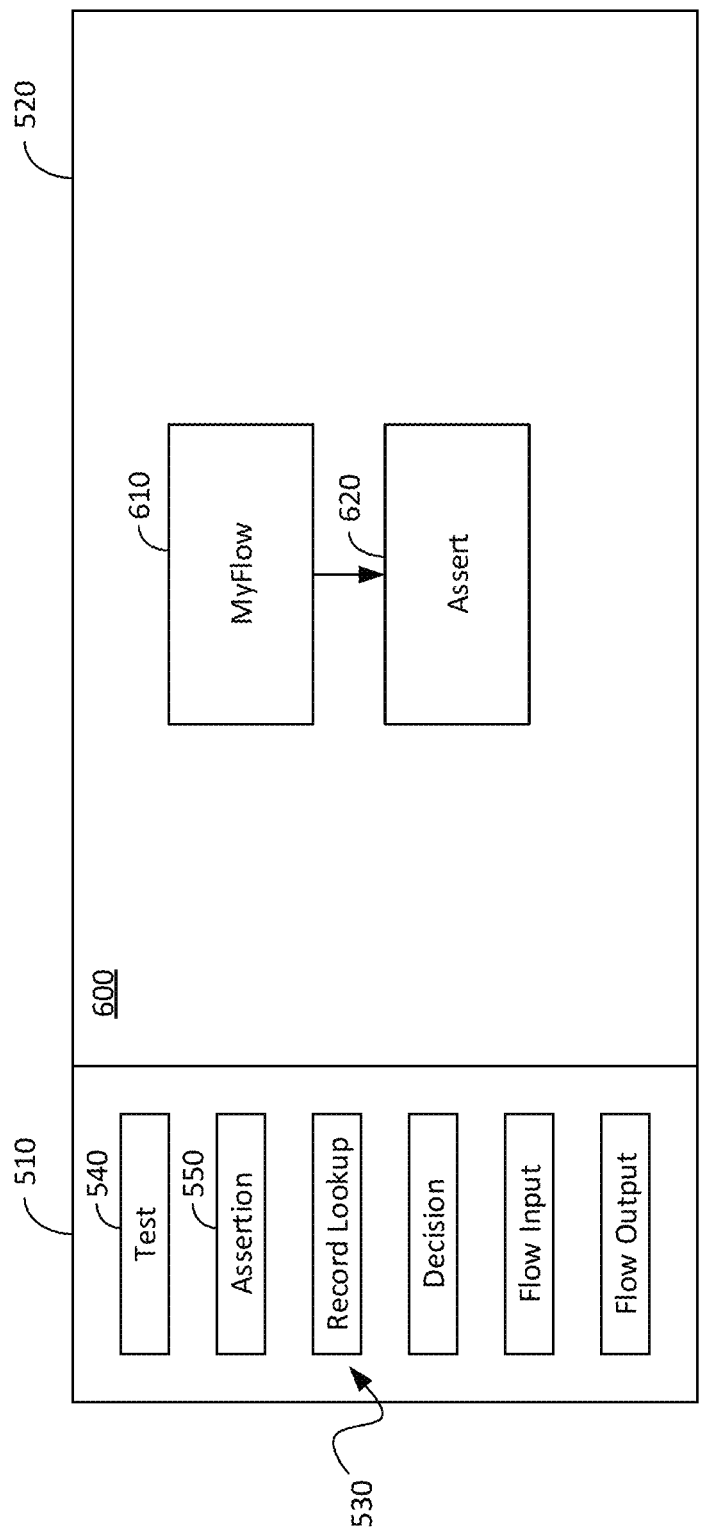
FIG. 6 illustrates an exemplary test created using the graphical programming test generator.

FIG. 6 illustrates an exemplary test 600 created using the graphical programming test generator 121. As seen in FIG. 6, the test 600 includes two nodes. The node 610 marks the application as a test application and sets any options for the test. Configuration options may include, for example, input values and inserting objects into the database. The node 620 is created using the assertion tool and may be customized to test a specific variable or other aspect of the applications or data within organization 140.

Figure 7:
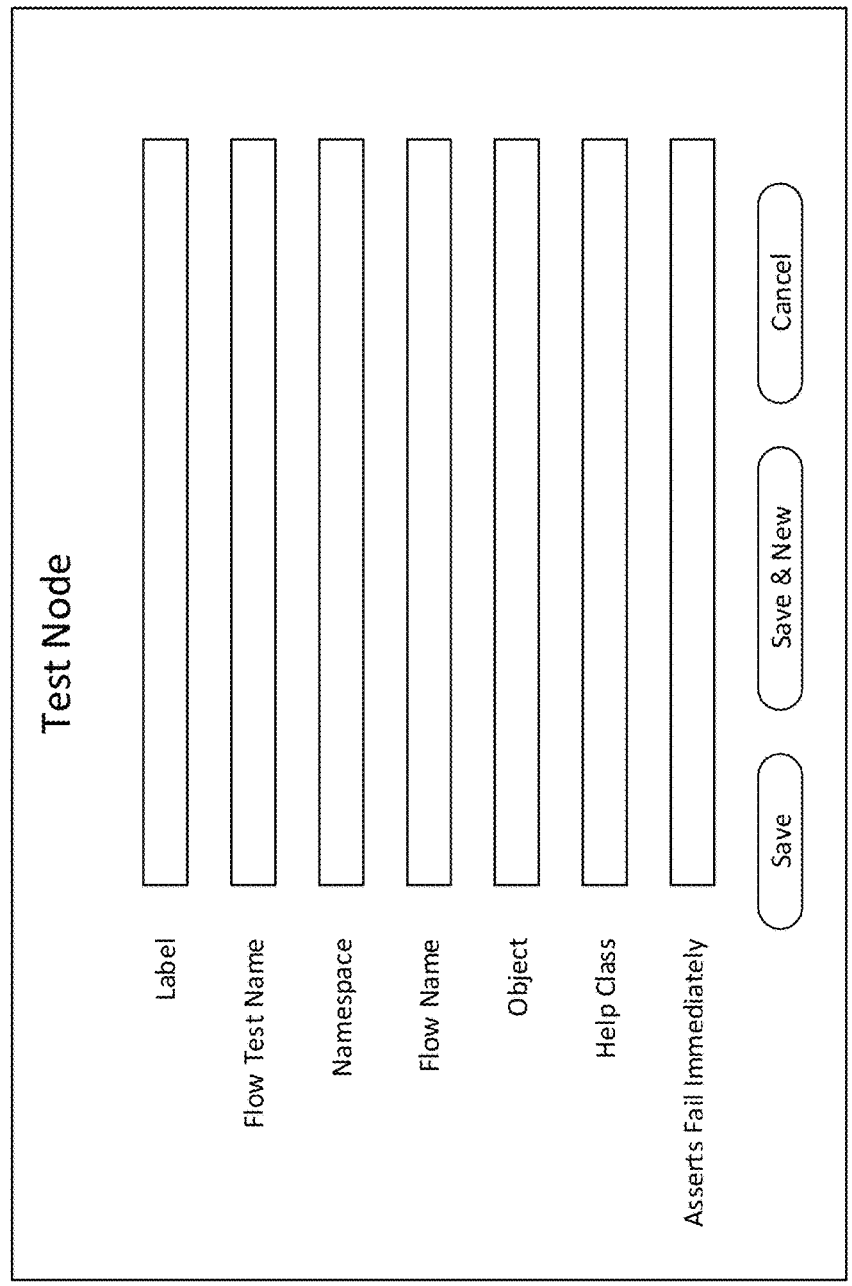
FIG. 7 illustrates a wizard corresponding to the test tool, in accordance with an embodiment.

FIG. 7 illustrates a wizard 700 corresponding to the test tool, in accordance with an embodiment. The wizard 700 is a customizable interface, which once completed, creates the node corresponding to the customized options. The input to the interface may be any combination of text boxes, drop down menus, browsers, check boxes, or the like. The interface may include a label defining a user-friendly label or description of the test node (e.g., "Test the Service Level Agreement"). The interface may optionally include a flow test name, which is a unique name within the entire organization 140 to run the test. The interface may further include a namespace, which may be used when testing an application from a third party independent software vender. The interface may further include a flow name defining the test to invoke. In one embodiment, for example the interface may further include an object defining database objects within the organization 140 to be inserted into the test prior to running the test. The interface may further include an option to add a helper class, such as an Apex class or the like. The test tool interface may further include an option to control how the test handles failures, labeled asserts fail immediately in the exemplary interface illustrated in FIG. 7. This option controls whether the test immediate stops after a first failure, or whether the test continues to evaluate the applications in the organization 140 to capture all of the failures.

Figure 8:
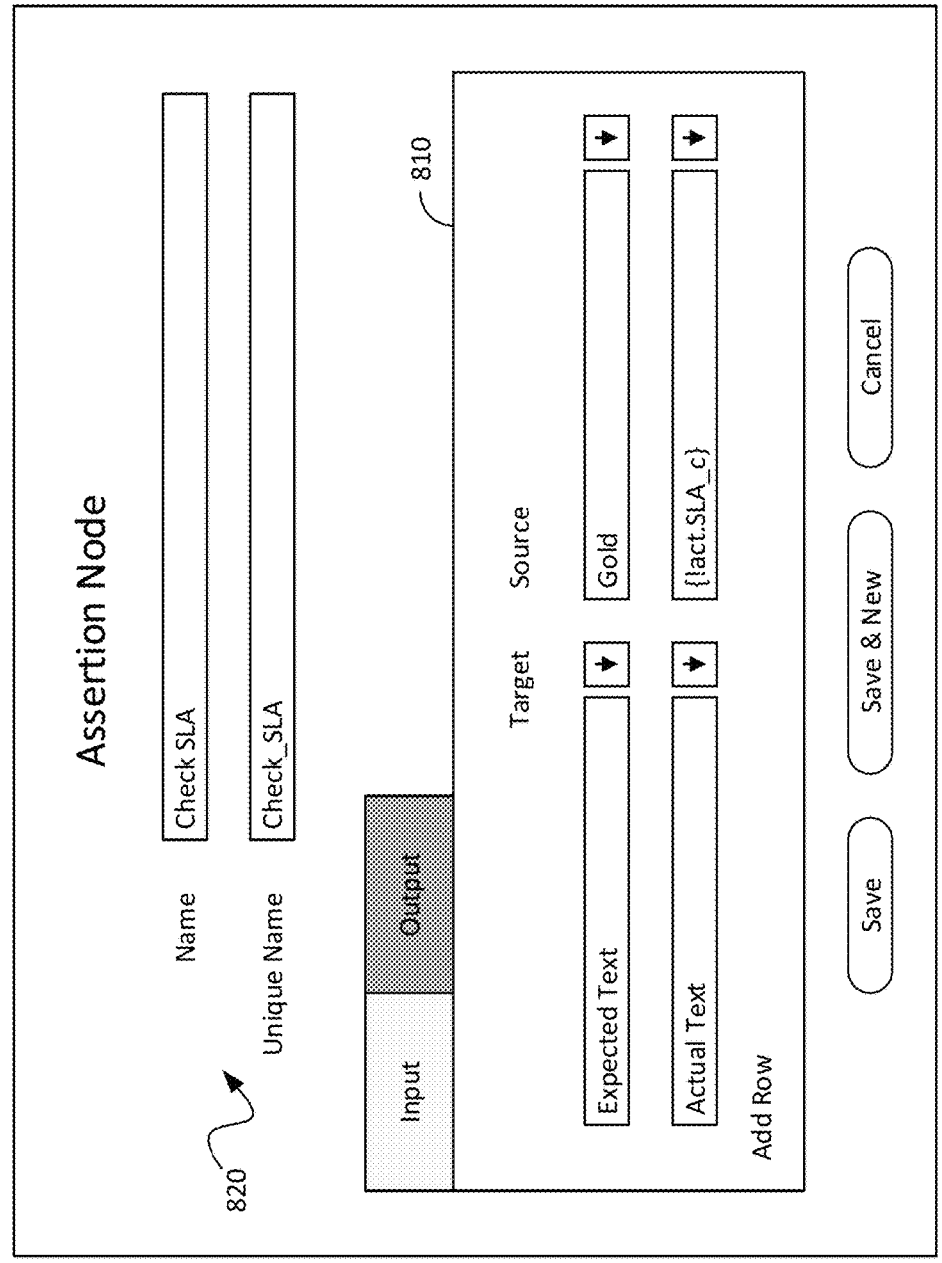
FIG. 8 illustrates a wizard corresponding to the assertion node in FIG. 6, in accordance with an embodiment.

FIG. 8 illustrates a wizard 800 corresponding to the assertion node in FIG. 6, in accordance with an embodiment. In this exemplary test, the author is testing the service level agreement (SLA) of the organization 140. The wizard includes an interface 810 for selecting a variable to be tested. In this example, the user has selected to test the variable !act. SLA_C. The variable may be selected from a drop-down menu, or any other user interface, corresponding to all variables that have been created in the organization 140. The variables may be organized by type (collection, scalar, object, collection of objects) and then alphabetically. Each variable created in an application in the organization 140 is required to have a unique name so that they can be referred to by other customer applications or test applications. As seen in FIG. 7, the test is set up to check if the variable !act.SLA_C, corresponding to the actual text of a record, the database is queried for the records' values are equal to "Gold." The assertion may be used to test the truth of a statement. The simplest assertion is whether a Boolean value is true or false. However, the test application can also compare two values to check if they are equal (or not). The expected and actual values may be of a number of types including: number, text, percentage, dates, times, and complex objects. For example, a test application may compare a text field from the database with an input value configured during test setup.

The wizard 800 further includes an interface 820 for naming the assertion node. By giving the assertion node a unique name, the assertion node can be linked to other nodes via the name in the same manner as the variables discussed above.

FIG. 9 illustrates a wizard 900 corresponding to the flow input tool, in accordance with an embodiment. The wizard 900 is a customizable interface, which once completed, creates the node corresponding to the customized options. The input to the interface may be any combination of text boxes, drop down menus, browsers, check boxes, or the like. The interface may include a label defining a user-friendly label or description of the input node created using the wizard 900. The interface may optionally include a flow input name, which is a unique name within the entire organization 140. The interface may further include a flow test name, linking the flow input node to the test node. The interface may further include an input name defining the name of the input variable being passed into the application being tested and a test value for the variable. The value of the input variable may be, for example, a number value or a text value (e.g., "Gold").

FIG. 10 illustrates a wizard 1000 corresponding to the flow output tool, in accordance with an embodiment. The wizard 1000 is a customizable interface, which once completed, creates the node corresponding to the customized options. The input to the interface may be any combination of text boxes, drop down menus, browsers, check boxes, or the like. The interface may include a label defining a user-friendly label or description of the output node created using the wizard 1000. The interface may optionally include an output name, which is a unique name for the output node within the entire organization 140. The interface may further include a flow test name, linking the flow input node to the test node. The interface may further include an output name defining the name of the output variable being passed from the test application. The output variable may be, for example, an expected number value or an expected text value (e.g., "Gold"). The output interface may further include one or more messages. The messages may be customized notes explaining what failed during the test.

Once the test application is finished, the graphical programming test generation system 120 converts the nodes of the test application into executable code and adds the test application to the organization 140. In one embodiment, for example, the nodes may be stored as metadata in a database. When the test is run, each node is evaluated and the state of the test is stored in an in-memory journal the journal can be used to later check prior values in an assertion.

Figure 11:
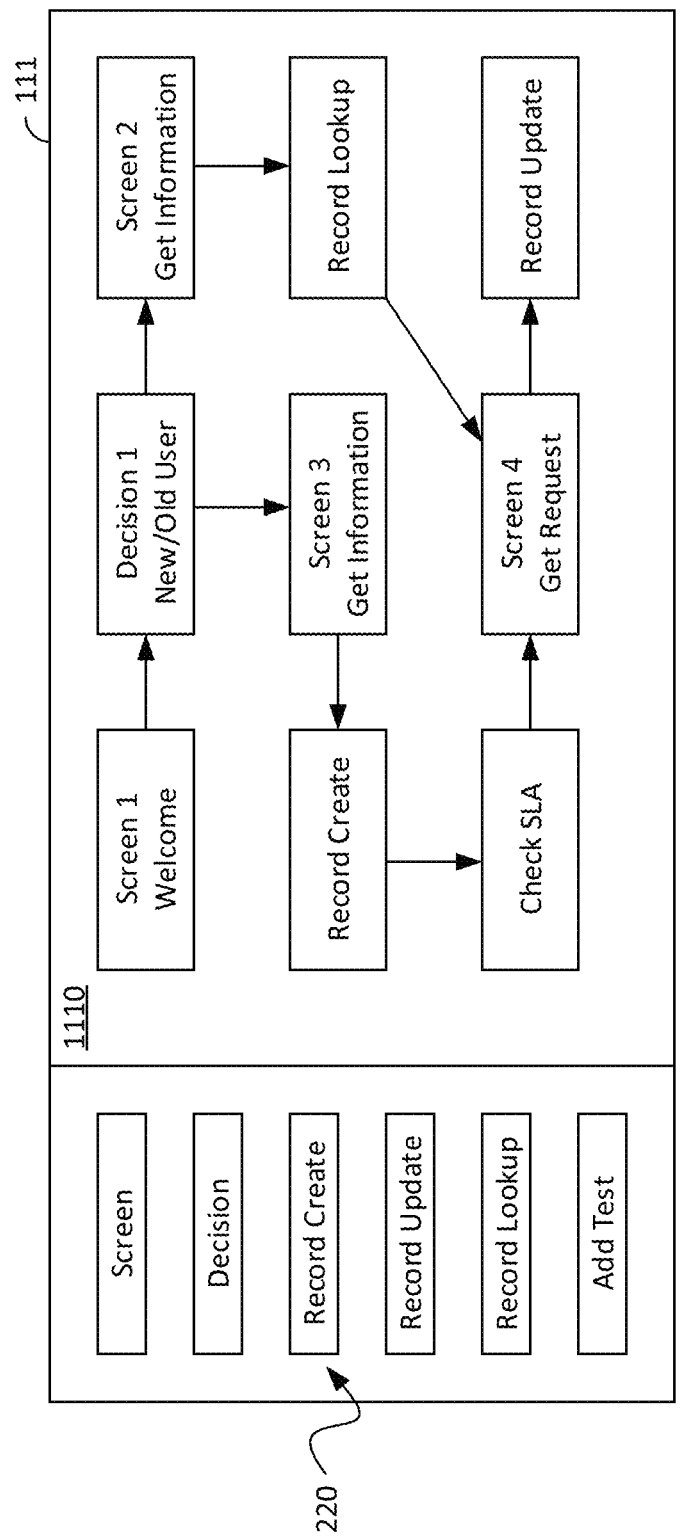
FIG. 11 illustrates an exemplary virtual application generated using the application generator.

FIG. 11 illustrates an exemplary virtual application 1100 generated using the application generator 111. As seen in FIG. 11, the application is similar to that of FIG. 3, however the additional test node created via the graphical programming test generation system 120. This allows the creator of the application of test the service level agreement of the account(s) in the database. As seen in FIG. 11, the tools 220 now include an add a test tool. When the tool is added to the canvas 210, a wizard or the like can be created which guides the user into selecting the test via the unique name associated with the test. In this way, as illustrated in FIG. 11, a prewritten test can be easily added to an application, thereby further simplifying the application creation process.

Figure 12:
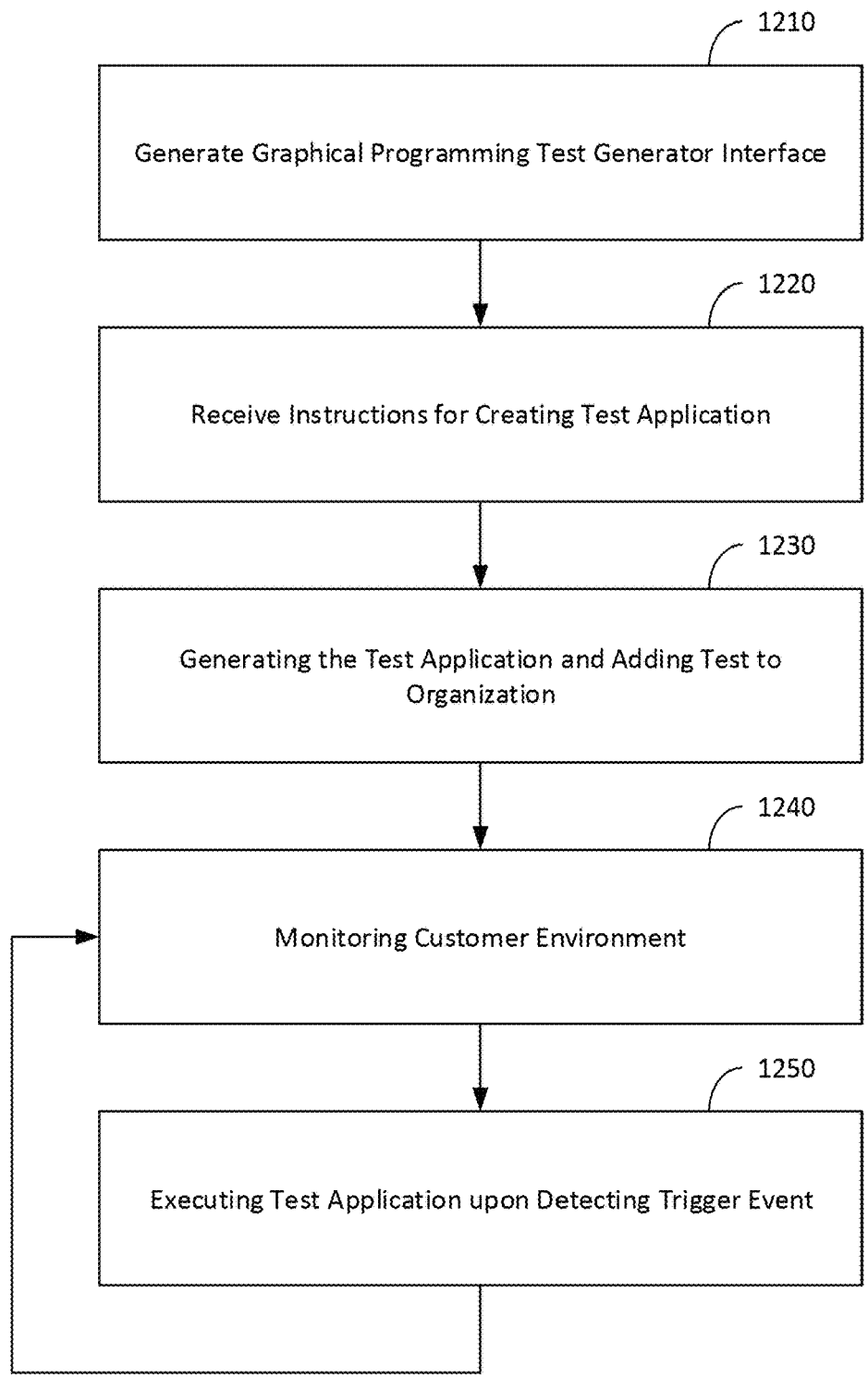
FIG. 12 is a flow chart illustrating an exemplary method for generating a test application in a graphical programming language for a plurality of customer applications in a customer environment, in accordance with an embodiment.

FIG. 12 is a flow chart illustrating an exemplary method 1200 for generating a test application in a graphical programming language for a plurality of customer applications in a customer environment, in accordance with an embodiment. The processor 122 of the graphical programming test generator generates the graphical programming test generation interface. (Step 1210). As discussed above, the graphical programming test generation interface includes a canvas and any number of tools to create the test application. The processor 122 then receives instructions for creating the test application via the generated interface. (Step 1220). The instructions include at least one customized node generated via the tools of the graphical programming test generation interface. As discussed above, a test node may be included which marks the application as a test application, rather than a customer application.

Once the test application is complete, as indicated by the author in any of a variety of ways, the processor 122 generates the application by converting the customized nodes into code and adds the test to a corresponding organization 140. (Step 1230). Once the test application is added to the organization 140, the test is available to be added to a customer application as discussed above using the unique name associated with the test application.

As discussed above, the test application may be automatically executed upon a trigger event. Accordingly, the processor 122 or another processor associated with the organization 140 may monitor the organization 140 for triggering events. (Step 1240). The triggering events can include, for example, a new customer application being added to the organization. In this manner, new customer applications added to the organization 140 automatically go through a quality check to ensure that the new customer application meets the standards and requirements of the organization as set though the created test applications. Any number of test applications could automatically be executed upon detection of a trigger. Upon detection of a trigger associated with one or more tests, the processor 122 or another processor associated with the organization executes the test and output any failures detected. (Step 1250). Failures list what test failed as well as the compared values (e.g.: Expected Gold but was Bronze. Additionally, a user defined message can be added. By utilizing continuous testing, the test failure should determine that the most recent change is valid or not. Accordingly, the processor monitoring the organization continuously evaluates the organization for consistency and adherence to the rules set forth in the test applications added to the organization, thereby maintaining the quality of a user's experience with the organization.

The term "exemplary" is used herein to represent one example, instance or illustration that may have any number of alternates. Any implementation described herein as "exemplary" should not necessarily be construed as preferred or advantageous over other implementations.

Although several exemplary embodiments have been presented in the foregoing description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. A method for generating an executable application in a graphical programming language in a customer environment, comprising:

generating, by a processor, a graphical programming interface, the graphical programming interface including a canvas and a plurality of tools including a standard tool available to all users and a custom tool for use in a specific customer environment, wherein the standard tool includes at least one of include a screen node, a decision node, a record create node, a record update node, a record lookup node and a record delete node and the custom tool includes a test tool;

generating, by a processor, the graphical programming test generator interface, the graphical programming test generator interface for generating the custom tool;

receiving, from the graphical programming test generator interface, instructions for creating the custom tool, the instructions comprising a plurality of interconnected and customized nodes, wherein the custom tool when added to the canvas becomes a node of a type embedding specific functionality associated with a test application and wherein at least one of the nodes defines a trigger event for executing the test application;

generating the executable application based upon the received instructions;

and executing, by a processor associated with the customer environment, the test application upon detection of the trigger event defined for the test application.

2. The method according to claim 1, wherein the trigger event is a new customer application being added to the customer environment.

3. The method according to claim 1, wherein the trigger event is a received modification to an existing one of the plurality of customer applications.

4. The method according to claim 1, wherein the trigger event is a received request to manually execute the test application.

5. The method according to claim 1, wherein the trigger event is a received request to execute the test application from one of the plurality of customer applications.

6. The method according to claim 1, wherein the executing the test application further comprises determining when a variable in the customer applications is true.

7. The method according to claim 1, wherein the executing the test application further comprises determining when a variable in the customer applications is false.

8. The method according to claim 1, wherein the executing the test application further comprises determining when a variable in the customer applications is equal to a value predefined in the test application.

9. The method according to claim 1, wherein the executing the test application further comprises determining when a variable in the customer applications is not equal to a value predefined in the test application.

10. The method according to claim 1, wherein the executing the test application further comprises determining when a setting in the customer applications is true.

11. The method according to claim 1, wherein the executing the test application further comprises determining when a database value in the customer environment is equal to a value predefined in the test application.

12. A graphical programming test generation system, comprising:

a graphical programming interface generator comprising a processor and a memory, the processor configured to generate a graphical programming interface to generate an executable application, comprising:

a canvas; and a plurality of tools including at least one standard tool available to all users and at least one custom tool for use in a specific customer environment wherein the standard tool includes at least one of include a screen node, a decision node, a record create node, a record update node, a record lookup node and a record delete node and the custom tool includes a test tool, each of the plurality of tools, when added to the canvas becoming a node of a type embedding specific functionality associated with the tool, generating a customizable node, wherein one of the plurality of tools is a test node, which when added to the canvas marks the executable application as a test application and defines a trigger event for executing the test application, wherein the processor is configured to:

generate the executable application based upon one or more customizable nodes added to the canvas;

and execute the test application upon detection of the trigger event defined for the test application.

13. The graphical programming test generation system according to claim 12, wherein the trigger event is a new customer application being added to the customer environment.

14. The graphical programming test generation system according to claim 12, wherein the trigger event is a received modification to an existing one of the plurality of customer applications.

15. The graphical programming test generation system according to claim 12, wherein the trigger event is a received request to manually execute the test application.

16. The graphical programming test generation system according to claim 12, wherein the trigger event is a received request to execute the test application from one of the plurality of customer applications.

17. The graphical programming test generation system according to claim 12, wherein the executing the test application further comprises determining when a variable in the customer applications is true.

18. The graphical programming test generation system according to claim 12, wherein the executing the test application further comprises determining when a variable in the customer applications is false.

19. The graphical programming test generation system according to claim 12, wherein the executing the test application further comprises determining when a variable in the customer applications is equal to a value predefined in the test application.

20. The graphical programming test generation system according to claim 12, wherein the executing the test application further comprises determining when a variable in the customer applications is not equal to a value predefined in the test application.

* * * * *